United States Patent
Wang

(10) Patent No.: US 7,717,005 B2
(45) Date of Patent: May 18, 2010

(54) SLIDE MECHANISM OF LINEAR TRANSMISSION APPARATUS

(75) Inventor: Chia-Jung Wang, Xindian (TW)

(73) Assignee: T-MOTION Technology Co., Ltd., Taipei (TW)

( * ) Notice: Subject to any disclaimer, the term of this patent is extended or adjusted under 35 U.S.C. 154(b) by 562 days.

(21) Appl. No.: 11/696,224

(22) Filed: Apr. 4, 2007

(65) Prior Publication Data
US 2008/0245165 A1 Oct. 9, 2008

(51) Int. Cl.
 *F16H 29/20* (2006.01)
 *F16H 25/20* (2006.01)
(52) U.S. Cl. ..................... 74/89.32; 74/89.33
(58) Field of Classification Search ............... 74/89.23, 74/89.32, 89.33
See application file for complete search history.

(56) References Cited

U.S. PATENT DOCUMENTS 5,445,045 A * 8/1995 Nagai et al. ............... 74/490.09
5,449,547 A * 9/1995 Miyazaki et al. ............ 428/217
5,927,144 A   7/1999 Koch

FOREIGN PATENT DOCUMENTS

DK        200001377       3/2002

* cited by examiner

*Primary Examiner*—Thomas R Hannon
*Assistant Examiner*—Terence Boes
(74) *Attorney, Agent, or Firm*—Chun-Ming Shih

(57) ABSTRACT

A slide mechanism of a linear transmission apparatus includes an actuating mechanism, a guide screw and a slide mechanism. The slide mechanism includes a fixing base, a primary guide rail, left and right secondary guide rails and a slide element. The fixing base has a through hole for passing the guide screw. The primary guide rail and each secondary guide rail are engaged to the guide screw and connected to the fixing base. The primary guide rail has a top panel and two side panels. Each secondary guide rail has an extended panel protruded from a side proximate to the primary guide rail. The top of each extended panel is not lower than the bottom of the side panel, and the slide element is sheathed onto the exterior of the guide rail, and a nut secured to the guide screw is formed in each guide rail.

11 Claims, 8 Drawing Sheets

SLIDE MECHANISM OF LINEAR TRANSMISSION APPARATUS

BACKGROUND OF THE INVENTION

1. Field of the Invention

The present invention relates to a slide mechanism, and more particular to a slide mechanism of a linear transmission apparatus applied in an electrical chair or an electric hospital bed.

2. Description of Prior Art

In general, an elderly or a handicapped usually does not have sufficient strength to support them to stand up from a seat, but usually needs another person to assist them. If a linear transmission apparatus is applied to the seat to constitute an electrical chair, then the height or angle of elevation can be adjusted to give much more convenience to the elderly and handicapped users. Thus, the subject of a slide mechanism of a linear transmission apparatus requires extensive researches and developments.

In a conventional slide mechanism of a linear transmission apparatus as disclosed in Denmark Pat. Publication No. 200001377, the transmission apparatus includes an actuating mechanism, a guide screw and a slide mechanism. The slide mechanism includes a fixing base, a guide rail and a slide element, wherein the fixing base has a through hole for passing the guide screw, and the horizontally disposed and U-shaped guide rail is covered onto the exterior of the guide screw and connected to the fixing base. The slide element is sheathed onto the exterior of the guide rail, and a nut secured to the guide screw is formed inside the guide rail.

In another conventional slide mechanism of a linear transmission apparatus as disclosed in U.S. Pat. No. 5,927,144, the transmission apparatus includes an actuating mechanism, a guide screw and a slide mechanism. The slide mechanism includes a fixing base, a pair of upper and lower guide rails and a slide element, wherein the fixing base has a through hole for passing the guide screw, and the upper and lower guide rails are covered onto the exterior of the guide screw and connected to the fixing base, and the slide element is sheathed onto the exterior of the upper and lower guide rails, and the guide rail includes a nut disposed therein and secured to the guide screw.

However, the practical applications of the aforementioned conventional slide mechanisms of a linear transmission apparatus still have the following problems. Since the guide rail has a long open slot, not only allowing dusts, moisture or foreign substances to enter into the apparatus, but also reducing the life expectancy greatly. Furthermore, the operation of the apparatus generates annoying noises. The slot of the guide rail is provided for the slide element to slide therein, and thus accidents or injuries including the fingers of a user or a child being clamped accidentally occur very frequently. In an integrally formed guide rail as disclosed in Denmark Pat. Publication No. 200001377, the weight of the guide rail is heavy and the cost is high. A frame of the slide element and the nut are connected by one or two ribs, and the strength of the connection is weak and insufficient to hold the weight or bear a sudden impact of an overweight user. As a result, the ribs between the nut and the frame are cracked or damaged frequently, and the users get hurt very often. The prior arts definitely need improvements.

SUMMARY OF THE INVENTION

In view of the foregoing shortcomings of the prior art, the inventor of the present invention based on years of experience in the related industry to conduct experiments and modifications, and finally developed a slide mechanism of a linear transmission apparatus in accordance with the present invention.

It is a primary objective of the present invention to provide a slide mechanism of a linear transmission apparatus, which covers an extended panel of the secondary guide rail by a primary guide rail and each side panel, so that dusts cannot enter into the interior of each guide rail to achieve the dust-proof effect, and prevent the fingers of a user or a child from being clamped or injured accidentally. The invention enhances the safety of the application.

To achieve the foregoing objective, the present invention provides a slide mechanism of a linear transmission apparatus, and the transmission apparatus comprises a guide screw driven and rotated by the actuating mechanism and a slide mechanism covered onto and coupled to a guide screw. The slide mechanism comprises a fixing base, a primary guide rail, a set of left and right secondary guide rails and a slide element, wherein the fixing base has a through hole for passing the guide screw, and the primary guide rail is covered onto a side of the guide screw and coupled to the fixing base and has a top panel and two side panels extended from the top panel, and the set of left and right secondary guide rails are engaged to another side of the guide screw and coupled to the fixing base and corresponding to a primary guide rail, and each secondary guide rail has an extended panel protruded from a side proximate to the primary guide rail, and the top of each extended panel is not lower than the bottom of each side panel, and the slide element is sheathed onto the exterior of the primary guide rail and each secondary guide rail, and the slide element forms a nut screwed to the guide screw and disposed in each guide rail.

Another objective of the present invention is to provide a slide mechanism of a linear transmission apparatus, and the slide mechanism uses a primary guide rail and each secondary guide rail to bear different loads. The rails are made of different materials, not only reducing the total weight but also reducing the material cost.

BRIEF DESCRIPTION OF DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

The technical characteristics, features and advantages of the present invention will become apparent in the following detailed description of the preferred embodiments with reference to the accompanying drawings. The drawings are provided for reference and illustration only, but not intended for limiting the present invention.

Figure 1:
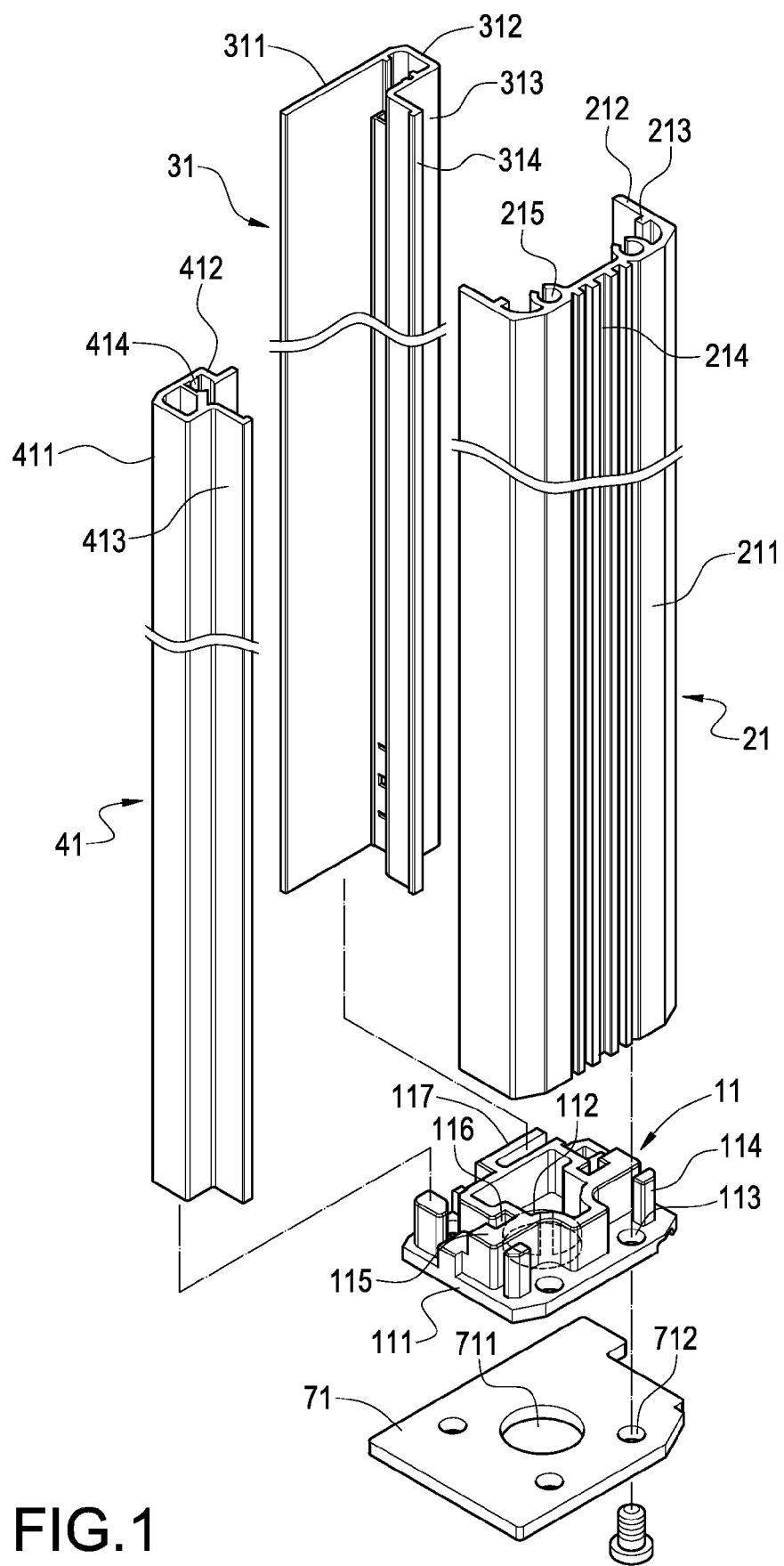
FIG. 1 is an exploded view of the present invention.
Figure 2:
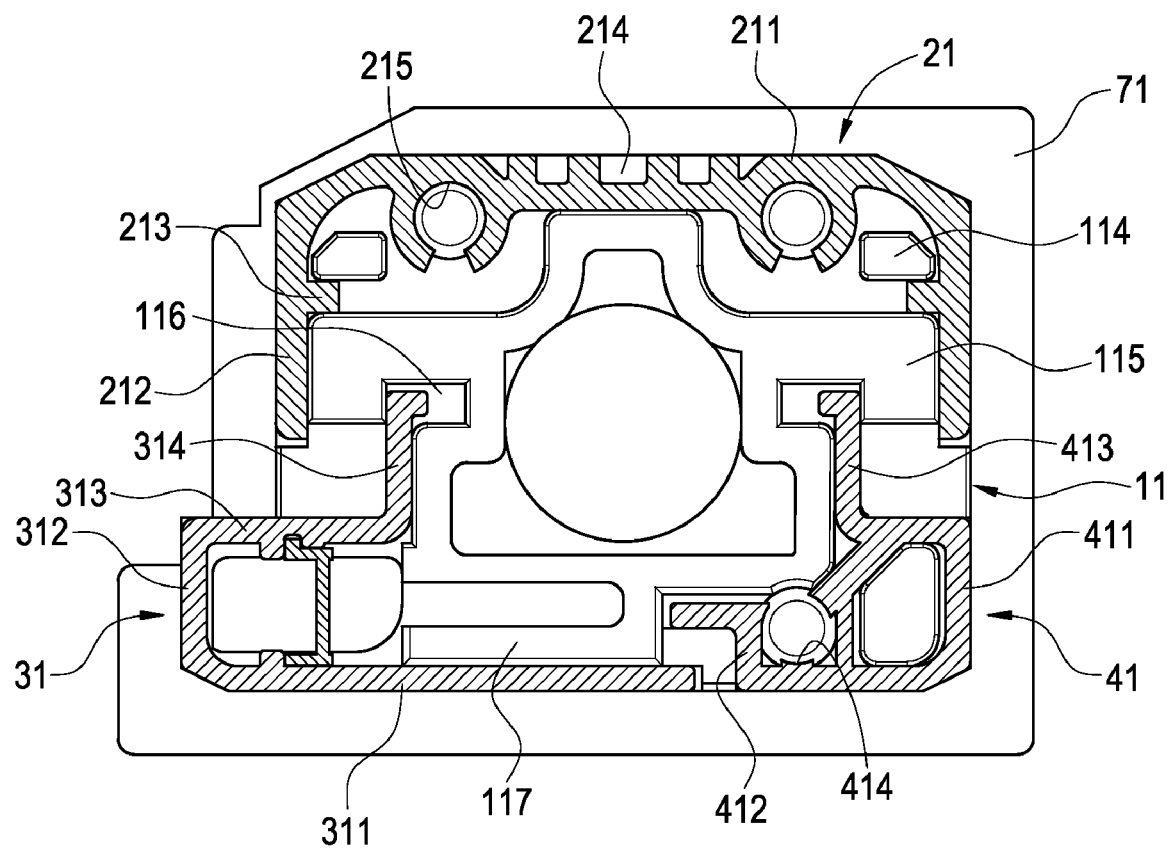
FIG. 2 is a cross-sectional view of an assembly of the present invention.
Figure 3:
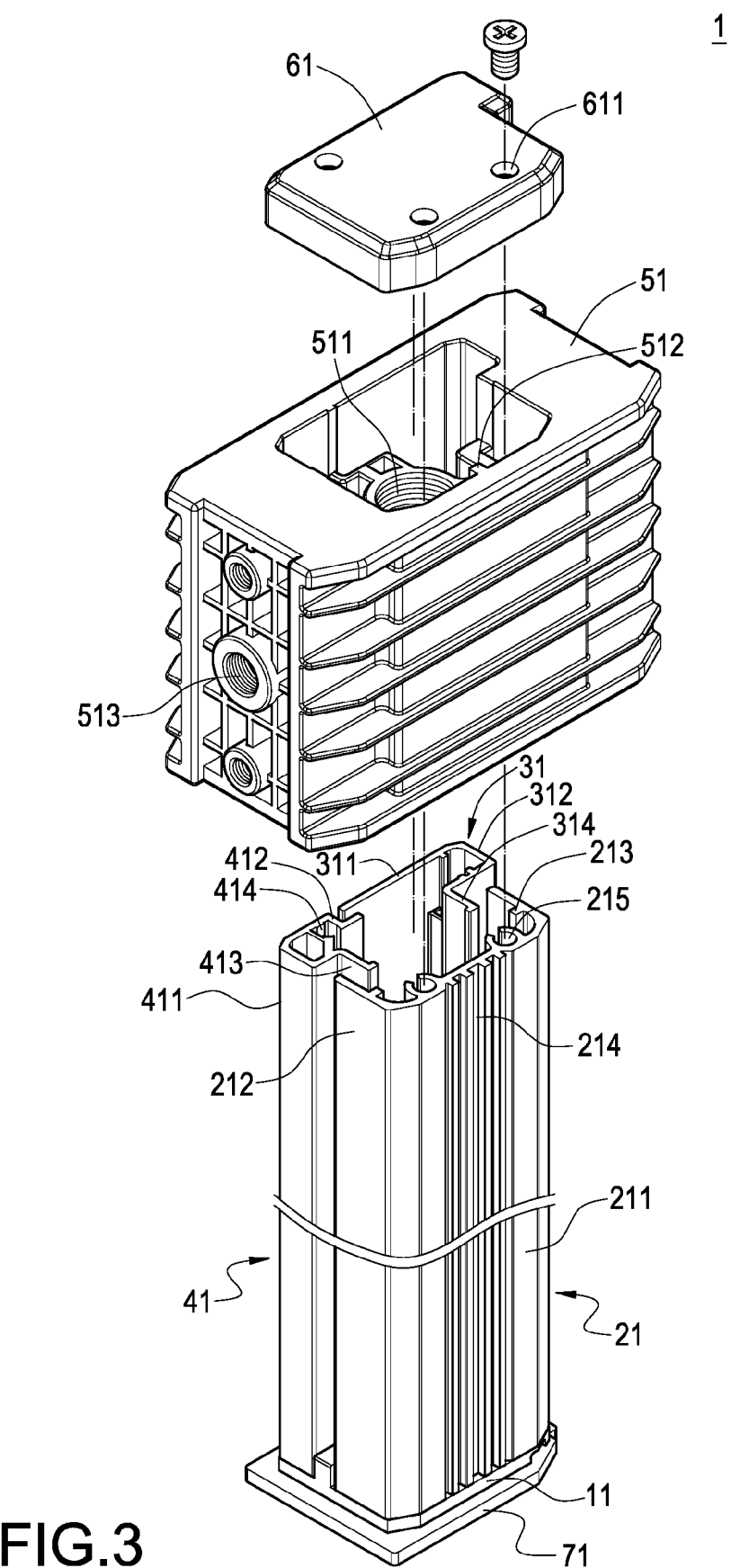
FIG. 3 is an exploded view of a set of guide rails and a slide element of the present invention.
Figure 4:
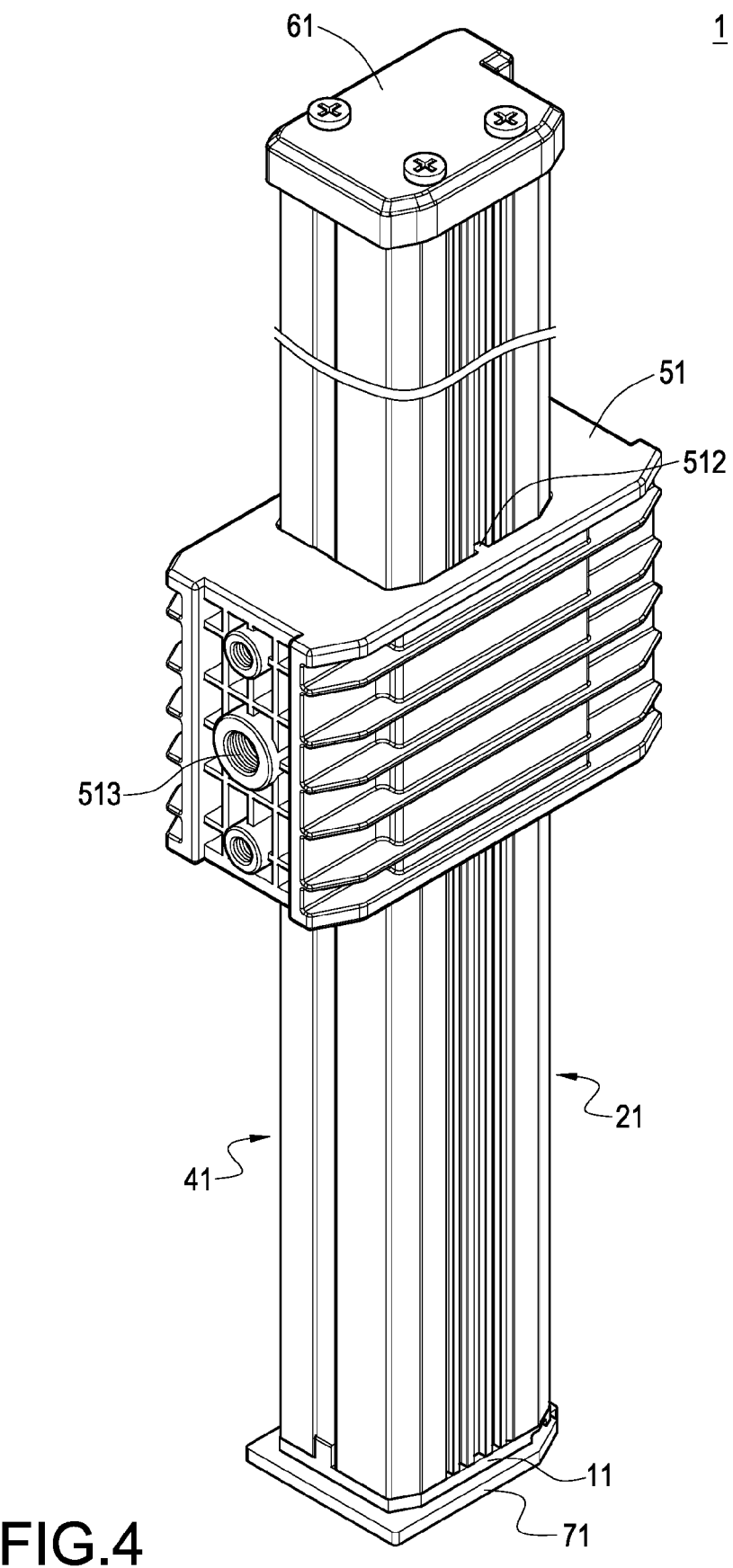
FIG. 4 is a perspective view of an assembly as depicted in FIG. 3.
Figure 5:
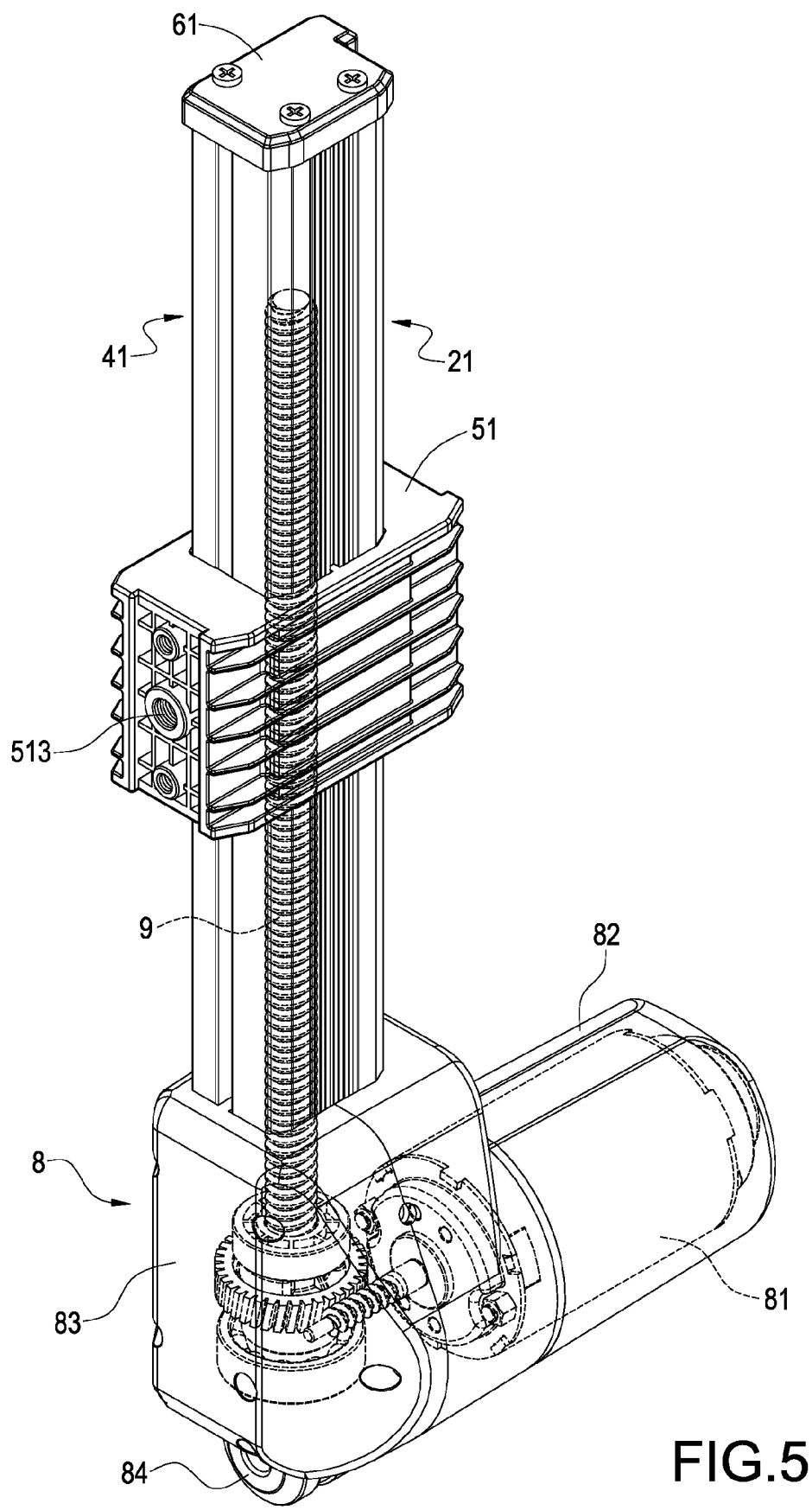
FIG. 5 is a perspective view of an assembly combined with a transmission apparatus of the present invention.

Referring to FIGS. 1 to 4 for an exploded view of the invention, a cross-sectional view of the invention, an exploded view of a set of guide rails and a slide element of the invention, and a perspective view of FIG. 3 respectively, the invention provides a slide mechanism of a linear transmission apparatus, and the slide mechanism 1 comprises a fixing base 11, a primary guide rail 21, a set of left and right secondary guide rails 31, 41 and a slide element 51.

Referring to FIGS. 1 and 2, the fixing base 11 is made of plastic and has a rectangular slab 111, and a through hole 112 is created at the center of the slab 111, and three penetrating holes 113 are disposed at each corner of the slab 111, and a positioning pillar 114 is protruded from a side of each penetrating hole 113. A positioning wall 115 enclosed into the shape of a room is protruded upward from the external periphery of the through hole 112, and two inverted L-shaped grooves 116 are formed at the middle section of the positioning wall 115, and the bottom of the positioning wall 115 is connected to a press arm 117.

The bottom of the primary guide rail 21 is connected to the fixing base 11 for bearing most of the loads of the slide element 51 (as shown in FIG. 3), and thus the primary guide rail 21 can be extruded and made of aluminum. The primary guide rail 21 includes a top panel 211 and two side panels 212 extended vertically from an end of the top panel 211 to form a U-shape with a flat bottom. The internal side of each side panel 212 has a rib 213, such that the primary guide rail 21 can be clamped and fixed between the positioning pillar 114 and the positioning wall 115 by the ribs 213. Further, the surface of the top panel 211 forms a plurality of parallel guide channels 214, and the internal side of the top panel 211 forms two screw holes 215 corresponding to the penetrating holes 113 for securing a plurality of fixtures such as mounting screws.

The bottoms of the left and right secondary guide rails 31, 41 are connected separately to the fixing base 11 and installed correspondingly with the primary guide rail 21, and the left secondary guide rail 31 is provided for installing a component such as a limit switch or an electric wire (not shown in the figure), and thus the left secondary guide rail 31 can be made of plastic. The left secondary guide rail 31 comprises a bottom panel 311, a vertical panel 312 extended vertically upward from an end of the bottom panel 311, a transversal panel 313 extended horizontally from an end of the vertical panel 312 towards the right secondary guide rail 41, and an extended panel 314 protruded vertically upward from an end of the transversal panel 313. The extended panel 314 is formed at the internal side of the side panel 212 and clamped into a groove 116 of the fixing base 11 by the extended panel 314, and the bottom panel 311 is pressed at the press arm 117 and fixed onto the fixing base 11. The top of the extended panel 314 is not lower than (that is equal to or higher than) the bottom of the side panel 212.

The right secondary guide rail 41 is not used for bearing most of the loads of the slide element 51 (as shown in FIG. 3), and thus it can be made of plastic, too. The right secondary guide rail 41 comprises a polygonal pipe 411, a fixing arm 412 extended and bent from the bottom of the polygonal pipe 411, an extended panel 413 extended upward from the top of the polygonal pipe 411, and a screw hole 414 formed between the polygonal pipe 411 and the fixing arm 412 and corresponding to the penetrating hole 113 for connecting a fixture such as a screw. The polygonal pipe 411 is sheathed onto the left positioning pillar 114 of the fixing base 11, and the extended panel 413 is formed in the side panel 212 and embedded into the groove 116, and the top of the extended panel 413 is not lower than (that is equal to or higher than) the bottom of the side panel 212, so as to prevent dusts from entering into the primary guide rail 21 and each secondary guide rail 31, 41, and achieve the dustproof effect.

The slide mechanism 1 further comprises a cover plate 61 and a fixing plate 71, and the cover plate 61 is covered onto external sides of the primary guide rail 21 and each secondary guide rail 31, 41, and a plurality of penetrating holes 611 corresponding to the screw holes 215, 414 are disposed thereon for connecting a plurality of fixtures such as mounting screws. The fixing plate 71 is attached onto an external side of the fixing base 11 and has a connecting hole 711 corresponding to the through hole 112, and a plurality of fixing holes 712 corresponding to the penetrating holes 113 are disposed around the external periphery of the connecting hole 711 for connecting with the mounting screws.

Figure 6:
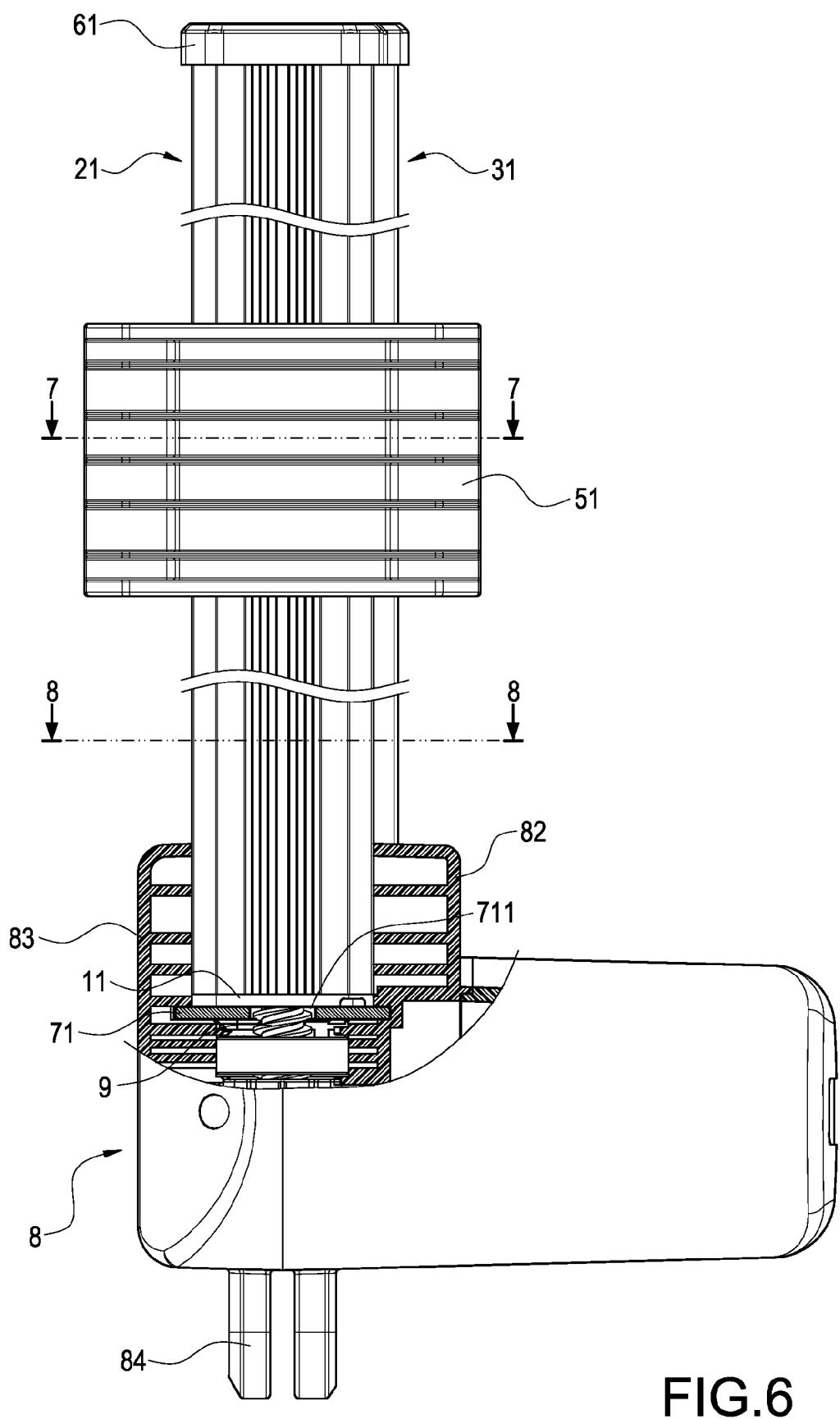
FIG. 6 is a front view of an assembly combined with a transmission apparatus of the present invention.

Referring to FIGS. 5 to 8 for a perspective view and a front view of an assembly combined with a transmission apparatus, and cross-sectional views of sections 7-7 and 8-8 of FIG. 6 respectively, a linear transmission apparatus of the invention comprises an actuating mechanism 8, a guide screw 9 driven and rotated by the actuating mechanism 8 and a slide mechanism 1 covered and connected to the guide screw 9. In this embodiment, the actuating mechanism 8 comprises a motor 81, a right casing 82 covered onto the exterior of the motor 81, and a left casing 83 engaged with the right casing 82 correspondingly. In the space enclosed by the right and left casings 82, 83, a transmission component such as a bearing or a worm gear is sheathed onto the guide screw 9, and a connecting base 84 is connected to the bottom of the right and left casings 82, 83, such that the guide screw 9 and the slide mechanism 1 are assembled first, and then the assembly is installed onto the right casing 82 and the motor 81, while the fixing base 11 and the fixing plate 71 are embedded into a fixing slot of the right casing 82, and a worm of the motor 81 is engaged with the worm gear of the guide screw 9, and the left casing 83 is covered and screwed with the slide mechanism 1 and the right casing 82 correspondingly, so as to complete assembling a linear transmission apparatus.

Figure 7:
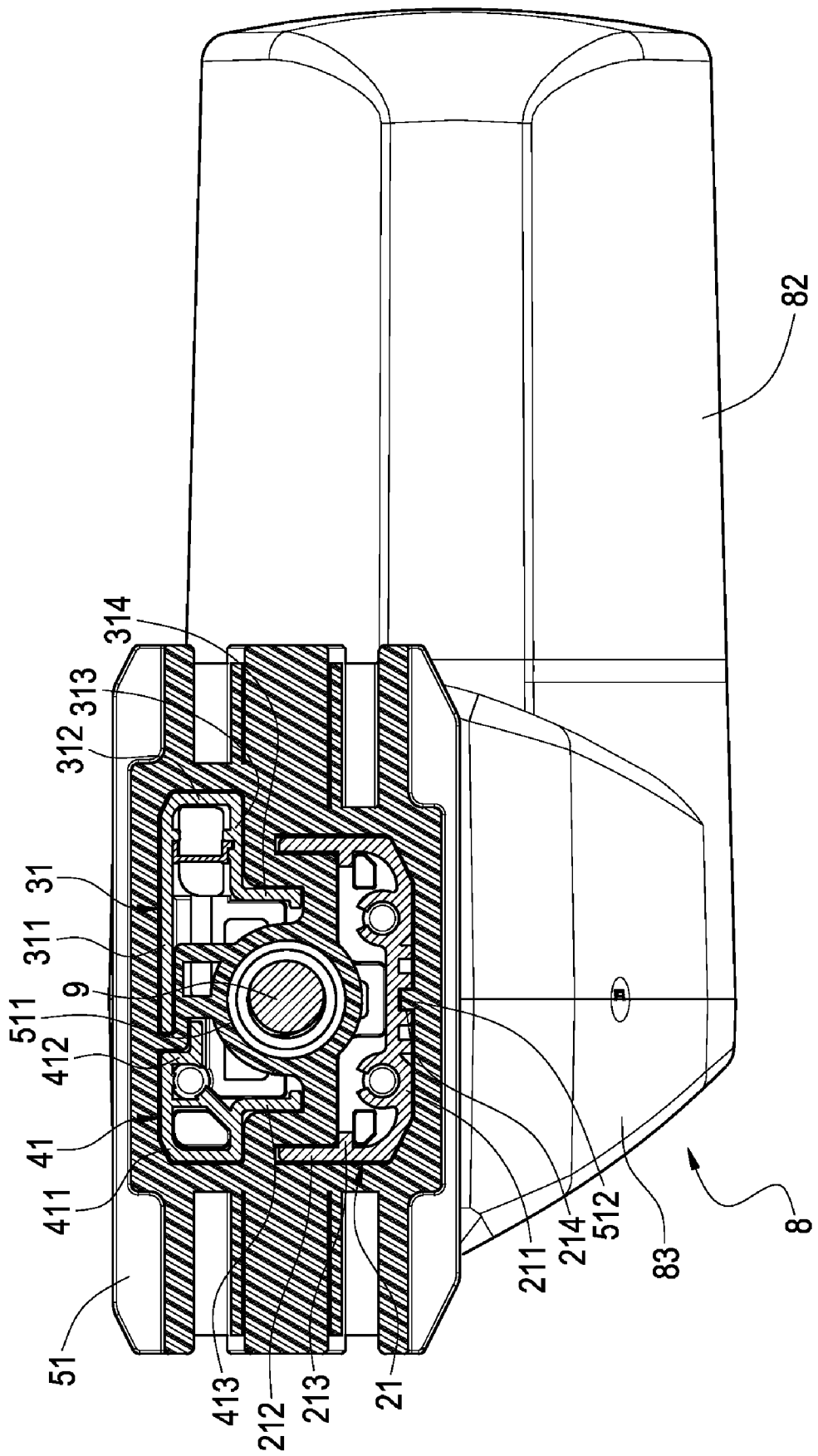
FIG. 7 is a cross-sectional view of Section 7-7 of FIG. 6.
Figure 8:
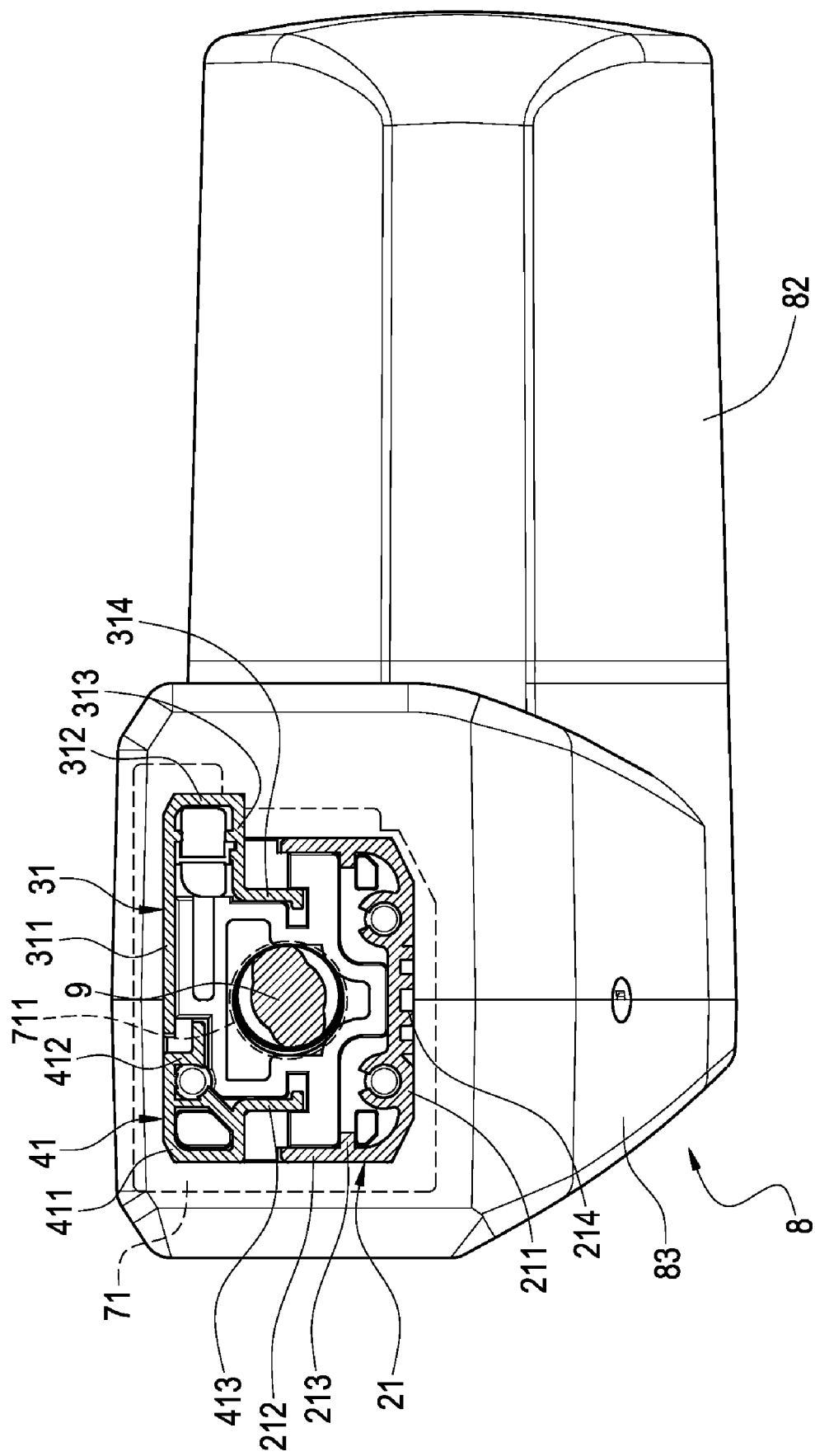
FIG. 8 is a cross-sectional view of Section 8-8 of FIG. 6.

Referring to FIGS. 7 and 8, a connecting base 84 of a transmission apparatus is connected to a support stand (not shown in the figure) of an electrical chair by bolts, and secured with a cushion (not shown in the figure) of the electrical chair by screws and screwed into a screw hole 513 of a slide element 51 for the application of the transmission apparatus. If a user wants to have an inclination of the cushion with respect to the floor, the user starts a motor 81 to drive and rotate a guide screw 9, so that a nut 511 of the slide element 51 and a guide screw 9 are screwed and connected, and the slide element 51 is be moved with respect to each guide rail 21, 31, 41, while the cushion of the electrical chair is tilted. The present invention not only provides a convenient way to assist elderly or handicapped users to stand up from an electrical chair, but also prevents the fingers of a user or a child from being clamped or injured accidentally to enhance the safety of the application.

The present invention is illustrated with reference to the preferred embodiment and not intended to limit the patent scope of the present invention. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A linear transmission apparatus comprising an actuating mechanism, a guide screw driven and rotated by the actuating mechanism, and a slide mechanism covered onto and coupled to the guide screw, the slide mechanism comprising:

a fixing base, having a through hole for passing the guide screw;

a primary guide rail, covered onto a side of the guide screw and coupled to the fixing base, and having a top panel and two side panels extended from the top panel;

a set of left and right secondary guide rails, engaged to another side of the guide screw, and coupled to the fixing base and corresponding to the primary guide rail, and each secondary guide rail having an extended panel protruded separately from a side proximate to the primary guide rail, and the top of each extended panel being not lower than the bottom of each side panel, and the primary guide rail and the secondary guide rails together surrounding the guide screw, and one of the side panels at least overlapping one of the extended panels, and the other of the side panels at least overlapping the other of the extended panels; and a slide element, sheathed onto the exterior of the primary guide rail and each secondary guide rail, and the slide element forming a nut screwed to the guide screw and disposed in each guide rail.

2. The slide mechanism of a linear transmission apparatus of claim 1, wherein the fixing base further has a slab and a plurality of penetrating holes, the through hole is formed at the center of the slab, the penetrating holes are disposed at the corners of the slab, and a plurality of screw holes corresponding to the penetrating holes respectively are formed on an internal side of a top panel of the primary guide rail and the right secondary guide rail for securing a plurality of mounting screws.

3. The slide mechanism of a linear transmission apparatus of claim 2, wherein the fixing base further comprises a plurality of positioning pillars and a positioning wall, the positioning pillars are disposed on a side of the slab, the positioning wall is protruded from an external periphery of the through hole, and a rib extended separately from an internal side of each side panel of the primary guide rail is fixed between one of the positioning pillars and the positioning wall.

4. The slide mechanism of a linear transmission apparatus of claim 2, further comprising a cover plate covered onto distal ends of the primary guide rail and each secondary guide rail, and having a plurality of penetrating holes corresponding to the screw holes disposed thereon for securing a plurality of mounting screws.

5. The slide mechanism of a linear transmission apparatus of claim 4, wherein each side panel of the primary guide rail is adjacent to the extended panels of the left and right secondary guide rails.

6. The slide mechanism of a linear transmission apparatus of claim 5, wherein the top of each extended panel of the left and right secondary guide rails is higher than the bottom of each side panel of the primary guide rail.

7. The slide mechanism of a linear transmission apparatus of claim 1, wherein the primary guide rail is made of aluminum.

8. The slide mechanism of a linear transmission apparatus of claim 1, wherein the left and right secondary guide rails are made of plastic.

9. The slide mechanism of a linear transmission apparatus of claim 1, wherein the left secondary guide rail includes a bottom panel, a vertical panel extended vertically upward from the bottom panel, and a transversal panel extended horizontally from an end of the vertical panel towards the right secondary guide rail, and the extended panel of the left secondary guide rail is protruded vertically upward from an end of the transversal panel.

10. The slide mechanism of a linear transmission apparatus of claim 1, wherein the right secondary guide rail includes polygonal pipe, and a fixing arm extended and bent from the bottom of the polygonal pipe, and the extended panel of the right secondary guide rail is protruded upward from the top of the polygonal pipe.

11. The slide mechanism of a linear transmission apparatus of claim 1, further comprising a fixing plate attached onto the fixing base and disposed at a side away from each guide rail, wherein the fixing plate has a connecting hole corresponding to the through hole.

* * * * *